No. 657,585. Patented Sept. 11, 1900.
J. H. CARROLL.
BOUQUET HOLDER.
(Application filed Mar. 19, 1900.)

(No Model.)

WITNESSES
C. W. Benjamin
Chas. G. Hensley

INVENTOR
James H. Carroll.
by Joseph R. Levy
ATTY

UNITED STATES PATENT OFFICE.

JAMES H. CARROLL, OF NEW YORK, N. Y.

BOUQUET-HOLDER.

SPECIFICATION forming part of Letters Patent No. 657,585, dated September 11, 1900.

Application filed March 19, 1900. Serial No. 9,161. (No model.)

*To all whom it may concern:*

Be it known that I, JAMES H. CARROLL, a citizen of the United States, residing at the city of New York, borough of Manhattan, county and State of New York, have invented certain new and useful Improvements in Corsage Bouquet-Holders, of which the following is a specification.

My invention relates to devices for holding or supporting bouquets or the like to or upon corsages or other appropriate places; and said invention consists in a device embodying substantially a supporting-bar, either plain or ornamental, means for securing such bar to the corsage, and a flexible thong, specifically a chain, one end of which is preferably secured or fixed to the said bar, the other end being adapted to be detachably supported upon such bar, so as to vary the amount of slack or tautness of the chain between its points of support upon the bar and to allow of a ready securement of the bouquet thereto and its detachment therefrom. My invention therefore resides in the construction and combination of parts hereinafter described, and further pointed out in the claim.

Figure 1:
Figures 2, 3, 4:
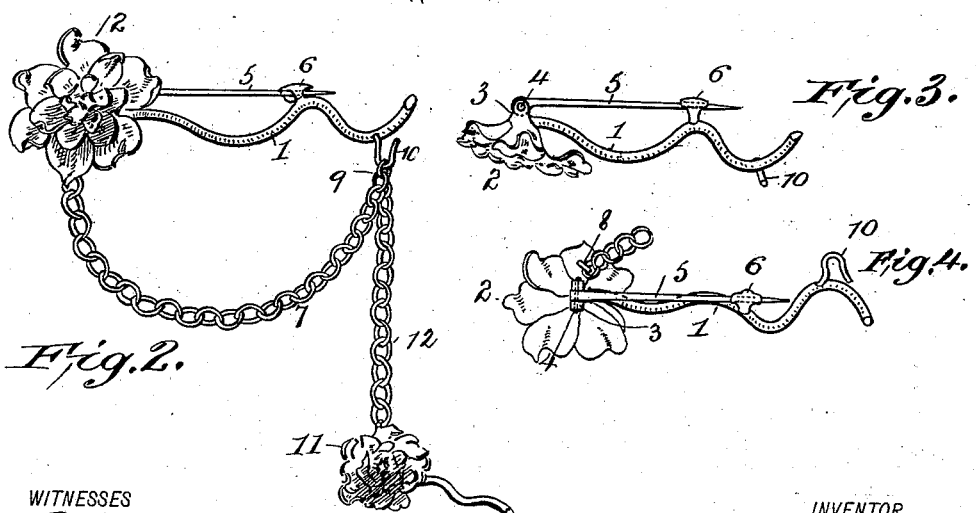

In the drawings forming part of this specification, Figure 1 is a diagrammatic view illustrating the use of my invention. Fig. 2 is a front elevation about the actual size of an embodiment of my invention. Fig. 3 is a top view, and Fig. 4 an inverted rear view.

I have illustrated my invention in connection with an ornamental holder carrying designs (in the present instance) corresponding to the character of the flower of which the bouquet is composed—that is to say, I prefer that the holder shall bear an artificial imitation of the flower worn—viz., where violets are to be worn artificial violets are to be produced upon the holder.

In the illustrated embodiment, 1 is the bar, of any desired material or configuration, in the present instance imitating the stem of the flower, at one end of which is produced an artificial violet 2, provided at its rear with a bifurcated extension 3, forming means for holding a cross-pin 4, to which the eye of the pin 5 is pivotally attached, the free end of the pin 5 being adapted to be held within a locking-catch 6, secured to the rear of the bar 1. At 7 is the flexible thong, which I prefer should be in form of a chain, which is preferably fixedly secured at one end of the bar, in this specific instance it being fastened to the rear of the flower by a pin 8, the links 9 of the chain being adapted to be passed over the hook 10, secured to the end of the bar at the side opposite to the fixed point of securement of the chain to the flower, as at 8.

By the foregoing means are provided for detachably securing the stem portion of a bouquet to the bar or its equivalent, said means being readily detachable and allowing an increase or decrease of the slack in the chain, so as to encompass a greater or less amount of stems or thickness thereof, and means for readily attaching or detaching the holder to or from the corsage or other appropriate place.

To the free end of the chain I secure a weight 11, in the form of an artificial flower, so that the pendent portion 12 of the chain may be kept taut upon the hook 10 and be less liable to become deranged, and at the same time means may be afforded for readily disengaging the chain from the hook. If desired, this pendent can be applied to the other end of the chain as well.

I prefer to employ a chain for the purposes hereinafter described, as the links afford ready means for attachment to the hook; but it is clear that instead of using a chain a cord or the like could be employed with satisfactory results. It is also clear that instead of the chain 15 being employed, a cord or other device equivalently constructed may be advantageously used.

Having described my invention, I claim—

The combination with the bar 1 formed to simulate the stem of a flower, the part 2 at the end of the bar simulating a flower, the pin 5 pivotally secured at one end to the rear of the part 2, the lock-catch 6 secured to the bar 1, the link chain 7 fixedly secured at one end, as at 8, to the rear of the part 2, the hook 10 on the bar, the hook being adapted to receive a link of said chain, and a weight on the free end of the chain; said weight simulating a flower, substantially as described.

Signed in the city, county, and State of New York this 12th day of March, 1900.

JAMES H. CARROLL.

Witnesses:
E. B. GOURDIER,
JOSEPH OATMAN.